Jan. 20, 1959  R. S. LANGDON  2,869,400
VARIABLE SPEED POWER TRANSMISSION MECHANISM
FOR USE WITH HYDRAULIC DRIVES
Filed May 24, 1954  5 Sheets-Sheet 2

INVENTOR.
Robert S. Langdon
BY
Barnes, Kiesel & Secrest
attys.

INVENTOR.
Robert S. Langdon

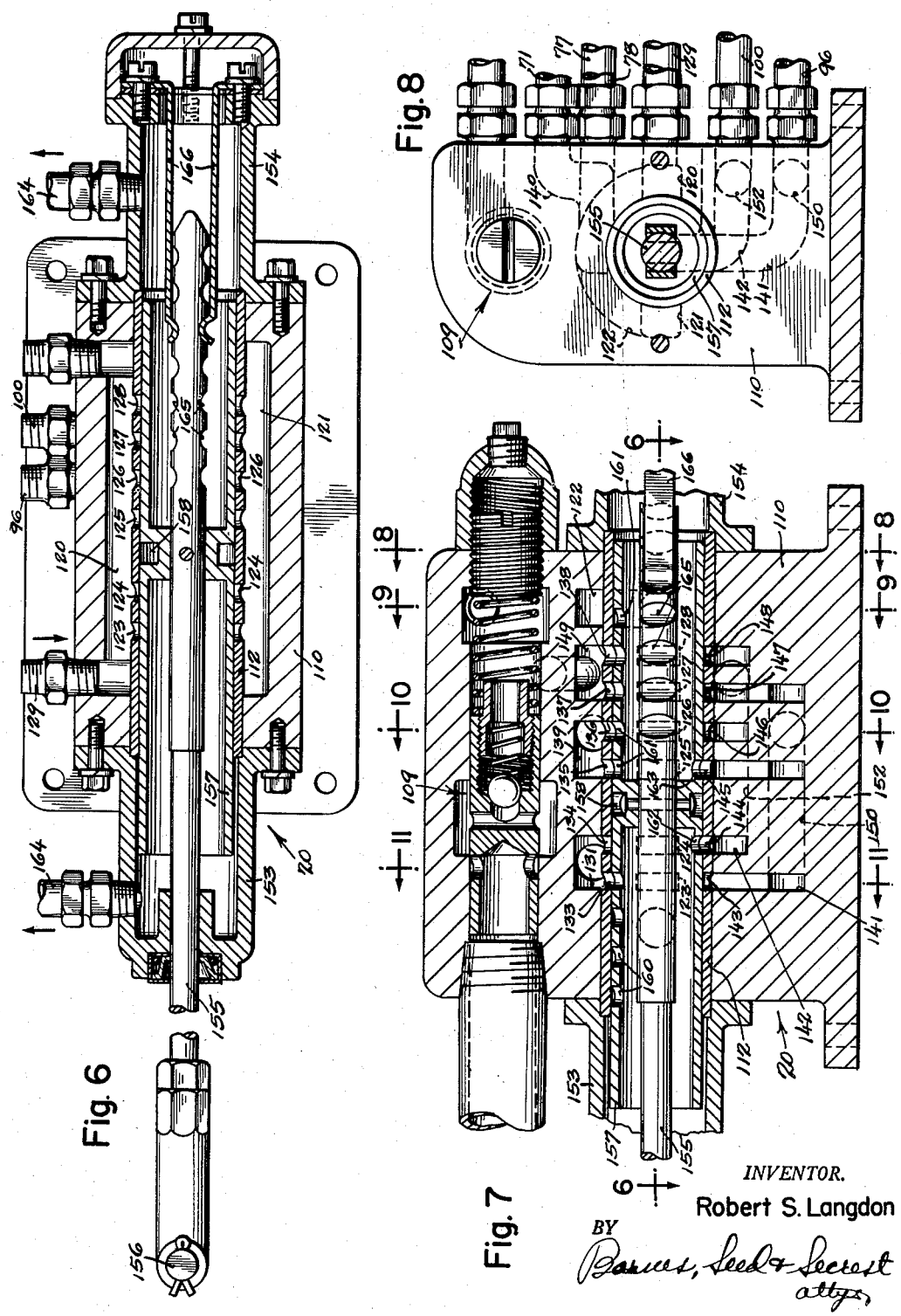
Jan. 20, 1959 — R. S. LANGDON — 2,869,400
VARIABLE SPEED POWER TRANSMISSION MECHANISM FOR USE WITH HYDRAULIC DRIVES
Filed May 24, 1954 — 5 Sheets-Sheet 4
INVENTOR.
Robert S. Langdon Jan. 20, 1959      R. S. LANGDON      2,869,400
VARIABLE SPEED POWER TRANSMISSION MECHANISM
FOR USE WITH HYDRAULIC DRIVES
Filed May 24, 1954      5 Sheets-Sheet 5
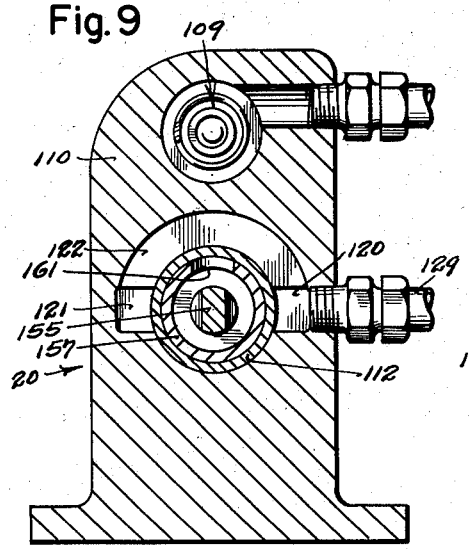
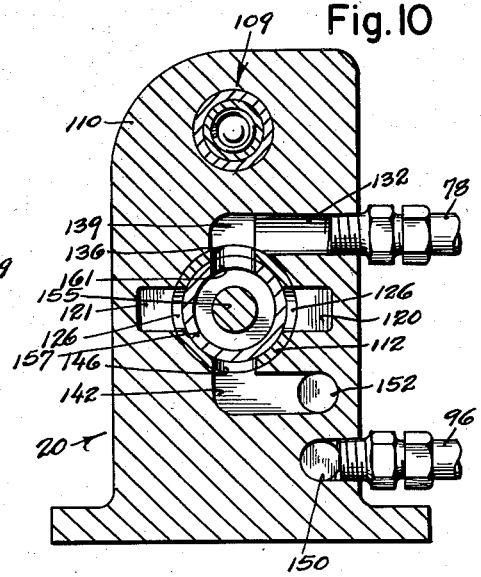
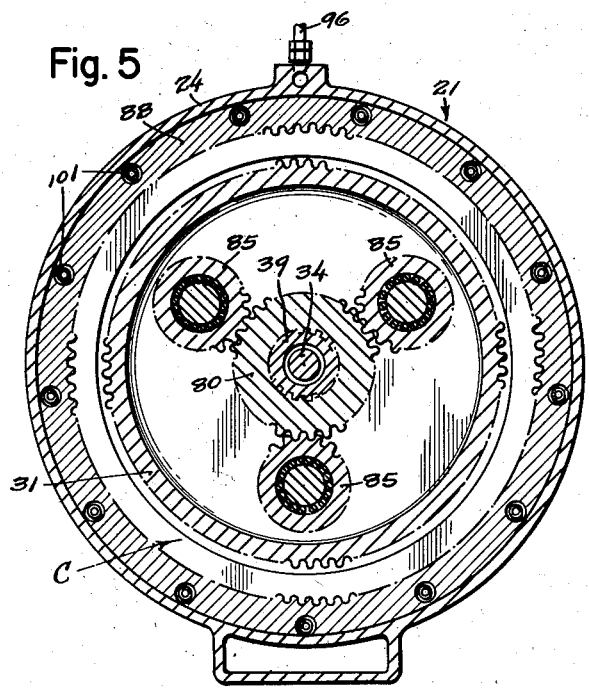
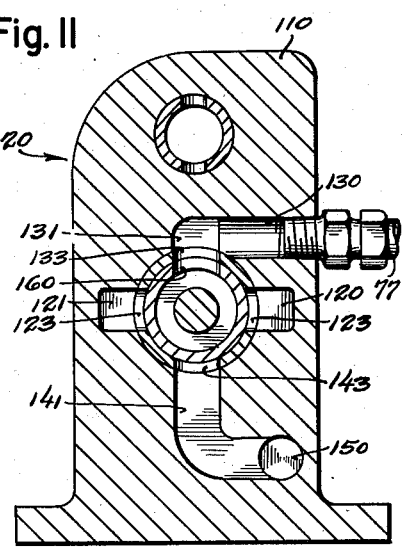
*INVENTOR.*
Robert S. Langdon
BY
*Barnes, Reed & Secrest*
*attys.*

United States Patent Office 2,869,400
Patented Jan. 20, 1959

2,869,400

VARIABLE SPEED POWER TRANSMISSION MECHANISM FOR USE WITH HYDRAULIC DRIVES

Robert S. Langdon, Seattle, Wash., assignor to Western Gear Works, Seattle, Wash., a corporation of Washington Application May 24, 1954, Serial No. 431,982

2 Claims. (Cl. 74—765)

This invention relates to variable speed power transmission mechanism, and for its general object aims to provide a constant-mesh transmission of perfected design for use with hydraulic drives, principally torque converters, enabling change from one gear ratio to another to be effected while full power is being fed into the transmission from the hydraulic drive unit.

It is a further and particular object to devise a transmission mechanism providing four speeds forward and two speeds in reverse.

In attaining the above ends, the present invention provides three planetary type gear sets, two of which are annular or ring-gear type sets and the other of which has no annular gear. The arrangement is one in which the two annular gear type planetary sets are employed alternatively with one such set passing power along in a forward direction and the other such set passing power along in a reverse direction. Means are provided for arresting the rotation of the annular gear of either of the annular gear type planetary sets so that the planet gears partake of planetary action to establish a reduction-drive through the concerned planetary set. The "forward" said planetary set may additionally have its planetary action inactivated and a direct lock-up established so as to obtain a 1:1 drive. The other planetary set, and namely the set having no annular gear, is one which produces either a direct drive or an overdrive ratio, and is so arranged as to work in conjunction with the annular gear type planetary sets and thereby compound the speed ratios of the one with the speed ratios of the other.

It is a yet further and particular object to devise a control valve for use with the present transmission enabling the several gear sets to be selected with ease and expedition.

With the foregoing objects and advantages in view, and additionally aiming to provide a variable-speed transmission which is unusually efficient in operation and of such advanced design that the same lends itself to economical manufacture and servicing ease, the invention consists in the novel construction and in the adaptation and combination of parts hereinafter described and claimed.

In the accompanying drawings:

Figure 1 is a longitudinal vertical sectional view through a transmission constructed to embody the preferred teachings of the present invention.

Fig. 2 is a reduced-scale somewhat schematic plan view showing the transmission housing in a package unit combined with a housing for an associated torque converter. Included in this view is the selector valve for the transmission and it is here pointed out that for purposes of clarity such valve is shown in this and other views of the drawings as connecting with the transmission by exposed pipes whereas, in the actual transmission, the valve body is so mounted, with an intervening gasket, upon the housing for the transmission that ported passages within the body connect directly with registering passages drilled in the housing.

Figs. 3, 4 and 5 are reduced-scale transverse vertical sectional views on lines 3—3, 4—4, and 5—5, respectively, of Fig. 1.

Fig. 6 is a horizontal sectional view of the selector valve drawn to a scale enlarged from that of Fig. 2 on line 6—6 of Fig. 7.

Fig. 7 is a fragmentary longitudinal vertical sectional view of said valve; and

Figs. 8, 9, 10 and 11 are transverse vertical sectional views on lines 8—8, 9—9, 10—10, and 11—11, respectively, of Fig. 7.

Figure 2:
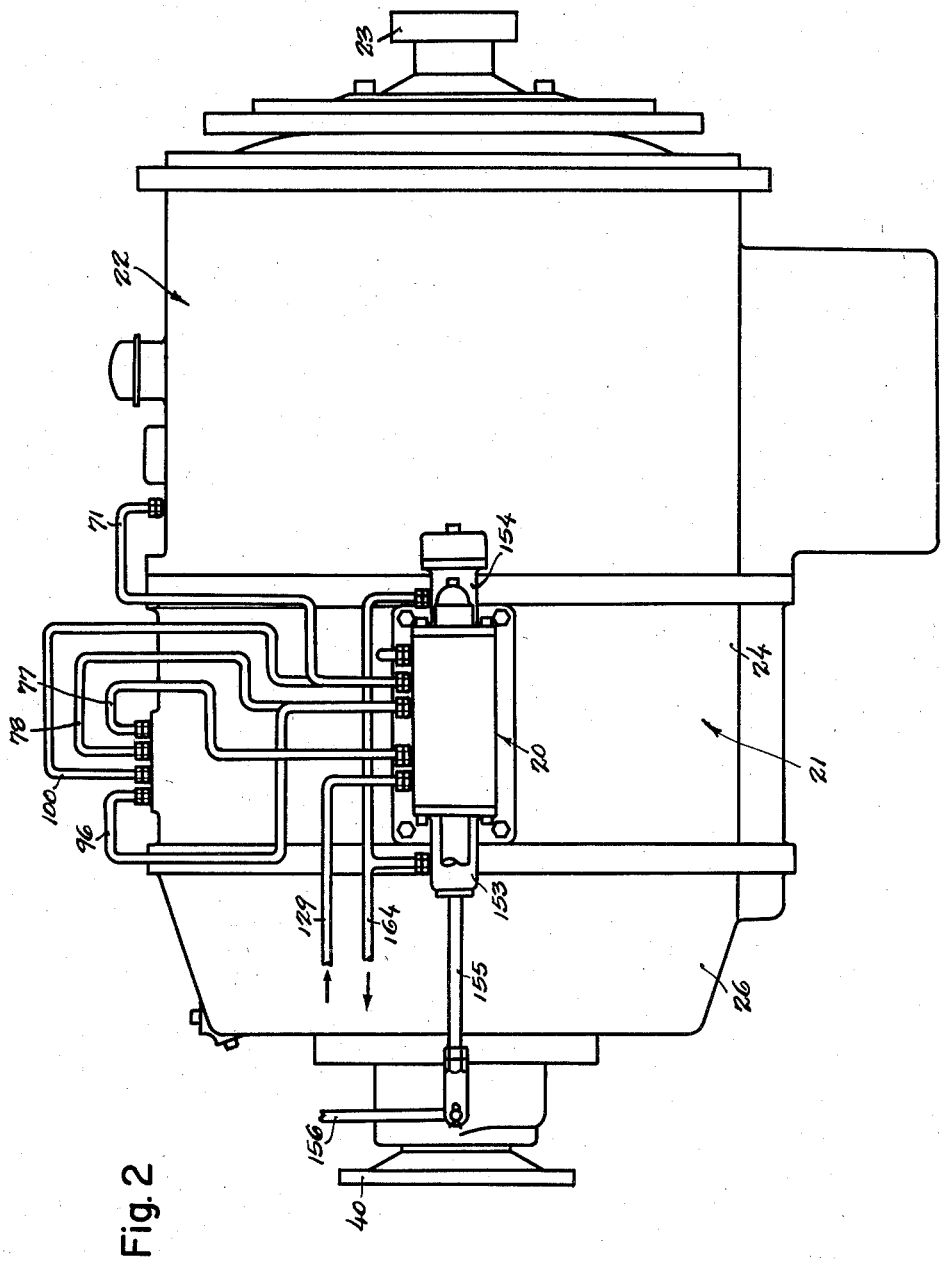
Figure 4:
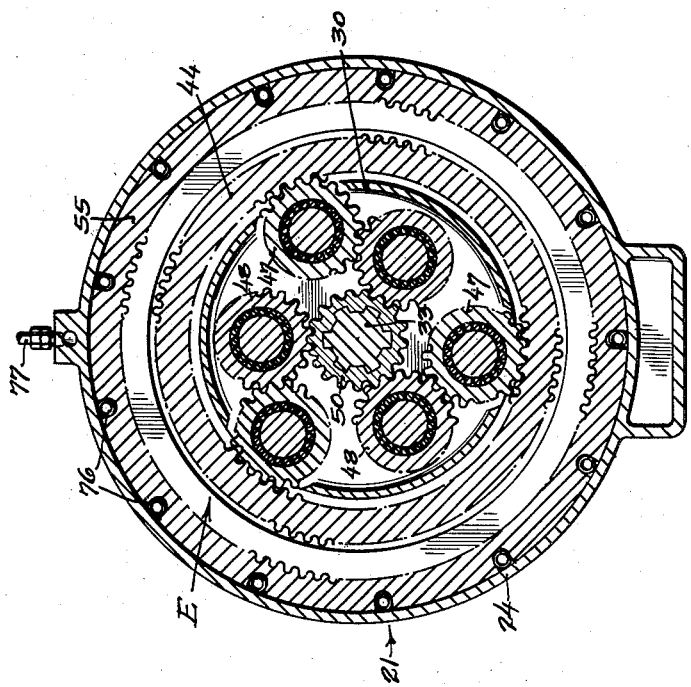
Figure 3:
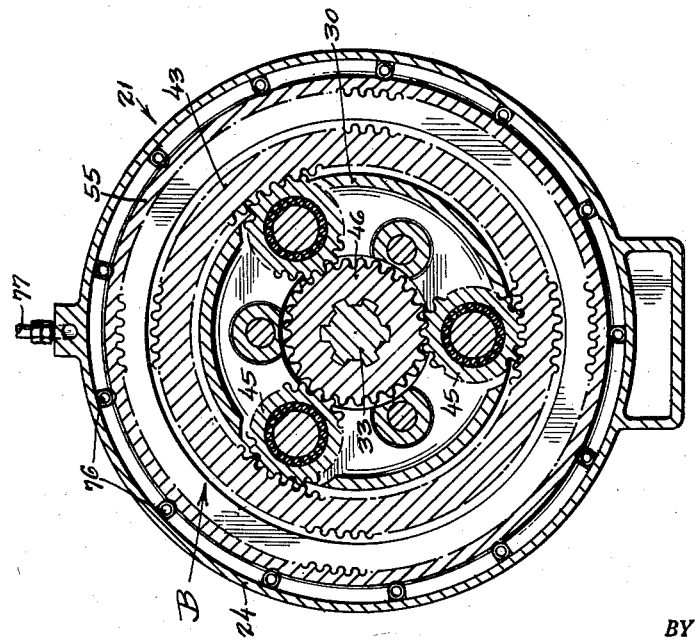

The present invention is concerned only with the transmission and the controls therefor, and while I have illustrated in Fig. 2 a compact package assembly containing the transmission together with a torque converter or other hydraulic drive to pass power into the transmission from an engine (not shown), the particular design of the hydraulic drive is unimportant and suffice it to here say that the same functions in the usual or a suitable manner and incorporates a pump which delivers high pressure oil, say 150# p. s. i., to a selector valve which controls the transmission. This selector valve is denoted generally by the numeral 20 and is shown in Fig. 2 as being mounted exteriorly of the housing 21 which contains the transmisison, this housing 21 being connected to a second housing 22 which contains the converter. 23 designates the input to the converter.

Figure 1:
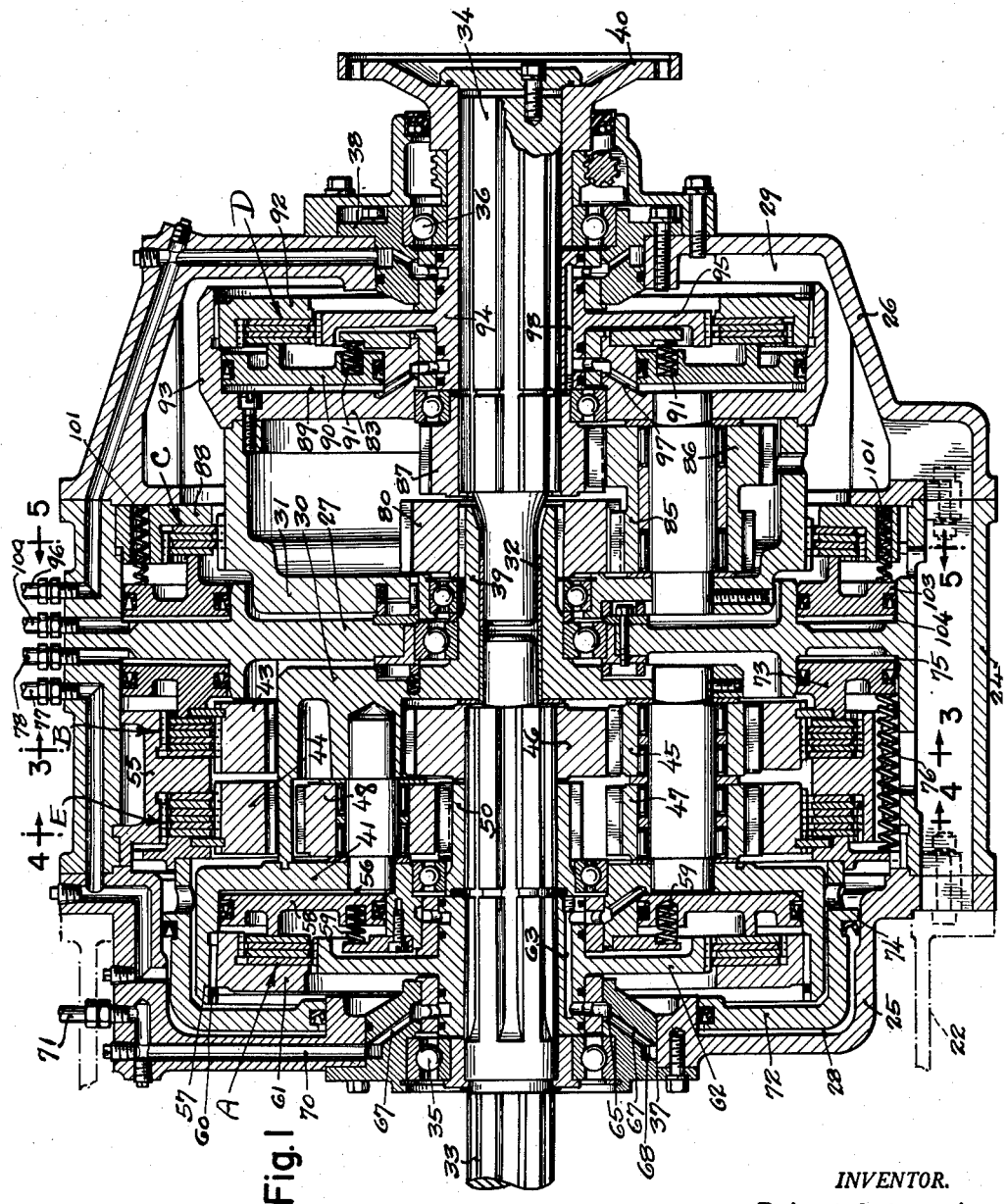

With reference being now had to Fig. 1, illustrating the transmission, it will be seen that said housing 21 is composed of three sections, a center section 24 open at both ends, and two cover sections 25 and 26 which, for purposes of the present description, will be hereinafter referred to as the forward cover and the aft cover, respectively. A bearing wall 27 within the center section divides the housing into a forward compartment 28 and an aft compartment 29, these two compartments finding communication through a center opening formed in the bearing wall.

Within each of these two compartments there is received a respective cage, as 30 and 31. Each such cage is journaled to turn about the longitudinal center of the housing as an axis, and it is one feature of the present invention that power is passed from the forward compartment into the aft compartment by a quill 39 extending through said center opening of the bearing wall as an axial prolongation of the cage 30. Said cage and its quill prolongation presents a through center-bore, and fitted into this center-bore is a bushing 32.

33 and 34 designate co-axial input and output shafts each projecting by its inner end into the bushing 32. As a complement to the journal mounting received from said bushing, each said shaft also derives an outer journal from a respective ball bearing, as 35 and 36, carried by bearing retainers 37 and 38 bolted or otherwise secured one to the forward cover 25 and the other to the aft cover 26. The output shaft has the usual output flange 40 splined thereto.

Journaled within the forward compartment to the front of the cage and fixed to the latter so as to turn in unison therewith is a drum 41, and this drum together with the cage functions as a carrier for the planetary gears of two axially spaced annular gear type planetary sets. The annular gears for these two planetary sets are designated by 43 and 44. One such planetary set provides planet gears 45 directly in mesh both with the related annular gear and with a sun gear 46 splined to the input shaft, whereas the other set has two groups of meshed planet gears 47 and 48 one meshing the related annular gear and the other meshing another sun gear 50 splined to the input shaft, thus causing the planet gears of the second said planetary set to pass to its related annular gear a turning motion opposite in direction to that which the planet gears of the first said planetary set pass to its related annular gear. Respective multiple-disc brakes designated generally by the letters B and E are provided for said annular gears, the friction plates of these brakes being splined to the related gears while the reaction plates are splined to a stationary backing ring 55 surrounding the annular gears.

Presented by said drum 41 is an annular cavity 56 open to the front end of the forward compartment 28 and disposed concentric with the input shaft, and also provided is a flange 57 extending forwardly beyond the cavity as a prolongation of the outer wall thereof. The cavity functions as a cylinder for a piston 58, and there is secured to the flange, as by a locking ring 60 working in conjunction with a spline fit, a plate 61 functioning as the backing member for a multiple-disc clutch A received between said plate and the piston 58. The reaction plates of this clutch are splined to the backing plate while the friction plates are splined to the rim of a wheel 62 the hub of which finds a spline fit upon the input shaft. To bring pressure oil to the cylinder 56 so as to move the piston 58 against the yielding pressure imposed by springs 59 the cylinder connects with the aft end of a longitudinal passage 63 drilled in the hub of said wheel 62, and communicating with the forward end of this passage is an internal annular groove 65 formed in the bearing retainer 37. Passages 67 drilled in the retainer lead to said internal groove from an external groove 68, and drilled in the forward cover 25 to connect with said external groove is a passage 70 connecting by a pipe 71 with the selector valve 20. A respective piston, as 72 and 73, is also provided for each of the two brakes E and B, and to receive these pistons there are provided cylinders, as 74 and 75, of which the former is formed in the forward cover section 25 and the latter in the bearing wall 27. Springs 76 common to both pistons exert brake releasing pressure thereon in opposition to the force of hydraulic fluid charged to the cylinders for the pistons, and for delivering this fluid pipes 77 and 78 are provided. Passages drilled in the housing connect these pipes with the cylinders.

From the foregoing it will be apparent that delivery of pressure fluid to the cylinder 56 so as to operate clutch A locks the planet carrier 30—41 for direct rotation with the input shaft 33 and thus causes the quill 39 to turn at a 1 to 1 ratio. Release of this clutch and operation of brake B so as to hold annular gear 43 stationary by tying the same to the stationary ring 55 causes planetary action of the planet gears 45, the quill 31 then rotating at a reduced speed which, with the illustrated gear ratios, gives a 3.3 to 1 reduction. Release of clutch A and brake B and activation of brake E gives the reverse counterpart of the last described action excepting that a differing number of gear teeth in the planet gears 47 and 48, as compared with the planet gears 45, gives a 2.83 to 1 reduction.

Proceeding now to describe the mechanism housed in the aft compartment, there is splined upon the quill 39 a pinion 80 serving as the sun gear of a third planetary set having its planet gears supported by a carrier comprised of the cage 31 and a drum 83 bolted or otherwise rigidly secured thereto, this third planetary set being one having no annular gear and employing, for its planetary process, two step-gears of which the smaller gear 85 meshes the sun gear 80. The larger gear 86 meshes a drive gear 87 splined to the output shaft 34. For said planet carrier there is provided a brake C, with the friction plates thereof being splined to the carrier and the reaction plates splined to a stationary backing ring 88.

As with the drum 41, the drum 83 presents an annular cylinder 89 which is open to the rear end of the compartment and is disposed concentric with the output shaft, and received in this cylinder is a piston 90 acting by force of pressure fluid working against the yielding thrust imposed by springs 91 to effect engagement of a multiple-disc clutch D having its backing plate 92 secured to a flange prolongation 93 of the drum. The reaction plates of this clutch are splined to the backing plate and the friction plates are splined to a wheel 95 having its hub 94 splined to the output shaft. The arrangement for delivering pressure fluid to the cylinder 89 is much the same as that for the cylinder 56, namely by a passage 97 communicating with the forward end of a passage 98 drilled longitudinally in the hub 94, a supply pipe 96 from the selector valve communicating with the aft end of such hub passage by connecting passages drilled in the center housing section 24, in the cover section 26, and in the bearing retainer 38.

For the brake C there is provided a piston 103 received in a cylinder 104 formed in the back face of the bearing wall 27. A passage drilled in the housing leads to this cylinder from a supply pipe 100. Springs 101 normally hold the brake disengaged.

From the above it will be seen that the brake C and clutch D augment the clutch A and brake B, or brake E, as the case may be, so as to give four speeds forward and two in reverse. With B and D engaged, the step-gears of the "over-drive" planetary gear set contained in the aft compartment are locked so as to partake of bodily rotation with the sun gear 83, and in consequence thereof the described 3.3 to 1 reduction afforded by the planetary action of the "forward" planetary set of the forward compartment is carried through to the output shaft 34. With B and C engaged, the step-gear rotates about a localized axis and multiplies the described 3.3 to 1 reduction of brake B by the .6 to 1 overdrive ratio of the step-gear's two gears 85 and 86.

A direct drive forward perforce obtains when the two clutches A and D are engaged. Combining brake A with clutch C produces a forward "overdrive" in that the lock-up from the input shaft to the quill 39 is multiplied by the .6 to 1 overdrive ratio between gears 85 and 86.

Now as to the "reverse" ratios, engaging the brake E and clutch D affords planetary action of the "reverse" planetary set of the forward compartment, and develops a lock-up from quill 39 to the output shaft, thus passing the 2.83 to 1 reduction of said "reverse" planetary set directly to the output shaft. By combining said brake E with brake C, a second "reverse" ratio is obtained, namely 1.7 to 1, which represents a multiplication of the "reverse" planetary set's reduction by the .6 to 1 overdrive of the "overdrive" planetary set's augmentation.

In respect of the selector valve which delivers pressure oil to the clutches, the preferred arrangement is one in which a single pump is employed to provide pressure oil for this purpose as well as for the lubrication of the bearings in the transmission, and for charging the torque converter with which the transmission is employed. However, these three duties desirably call for oil under different pressures. To provide oil at these different pressures a reducing valve 109 is employed and for compactness in design I have shown such reducing valve as being housed in the same body 110 which contains the selector valve. The details of the reducing valve are no part of the present invention, and suffice it to here say that the same is so engineered as to reduce a high pressure of, say, 150# p. s. i. suitable for operation of the clutches to a lower pressure of, say, 50# p. s. i. suitable for charging the converter. Also, some of the high-pressure oil delivered to the control valve is reduced to 25# p. s. i. for use in lubricating the bearings in the transmission.

Now considering said control valve, the body 110 provides a through-bore, and press-fitted therein is a liner 112 formed at the top, bottom and along each side with a respective series of longitudinally spaced ports, there being six ports in each series denoted by 123, 124, 125, 126, 127 and 128 in the instance of each side series, by 133, 134, 135, 136, 137 and 138 in the instance of the top series, and by 143, 144, 145, 146, 147 and 148 in the instance of the bottom series. The like ports in each series occupy a common transverse vertical plane, and considered from left to right as viewed from the vantage point of Fig. 7 there is a comparatively wide spacing between the second and third ports of these several series of ports.

All of the ports 123 through 128, inclusive, at each side of the liner communicate by respective longitudinal manifolds, as 120 and 121, and beyond an end limit of said series of ports such manifolds are joined by an arched passage 122. The above-mentioned source of high-pressure oil supply connects by a pipe or pipes 129 with said manifolds.

The several ports in the top and in the bottom series of ports are related to one or another of the transmission clutches. Said oil pipe 77 for brake E connects by a body passage 130 with a pocket 131 common to the two top ports 133 and 134. Oil pipe 78 for brake B connects by a body passage 132 with a pocket 139 common to the two top ports 135 and 136. Oil pipe 71 for clutch A connects by a body passage 140 with a pocket 149 common to the two top ports 137 and 138. In the bottom series of ports, the three alternate ports 143, 145, and 147 are joined by passages 141 with a manifold 150, and connect by pipe 96 with the clutch D. The remaining ports 144, 146 and 148 are joined by passages 142 with a manifold 152, and connect by pipe 100 with the brake C.

Bolted to the valve body to provide a prolonging closure for each end thereof are caps 153 and 154, and received for endwise sliding movement through a stuffing box provided by one of these caps is a shipping rod 155 connected by its exposed end with a manually controlled shift lever 156. Within the body said shipping rod is pinned or otherwise connected to a sleeve valve 157 finding a sliding fit within the liner 112. Intermediate its ends the sleeve valve is provided in its periphery with a circumscribing groove 158, and fore and aft of such groove, there are provided in the sleeve both at the top and at the bottom thereof a plurality of ports arranged by sliding movement of the valve to be brought into register with selected top and bottom ports of the liner. Considered in more particularity, there are at the top four such ports 160 at the left side, and five such ports 161 at the right side of the circumscribing groove 158, and at the bottom there is one such port, as 162 and 163, at each side of the groove. To distinguish the ports of the liner from those of the sleeve, the former will be hereinafter termed wall ports and the latter will be hereinafter termed valve ports.

The function of the groove 158 is to establish connection from the supply manifolds 120 and 121 with selected wall ports, thus to activate selected clutches. These established connections are such as will activate the brakes and/or clutches in pairs, either of the two brakes and one clutch in the forward compartment with either the one brake or one clutch in the aft compartment, selectively, and namely brake E with either brake D or brake C, brake B with either brake D or brake C, and brake A with either brake D or brake C. To this end each activating position occupied by the groove brings said supply manifolds simultaneously into communication with a co-planar pair of top and bottom wall ports. The function of the sleeve ports 160, 161, 162 and 163 is to coincidently bring all of the other wall ports into communication with the hollow center of the sleeve valve. Oil-return pipes 164 feed from said center to an oil reservoir (not shown).

Upon the inner end of the shipping rod there are provided a set of seven notches 165 spaced at intervals of the length distances corresponding to the step-by-step spacing between the wall ports of the liner, and two complementing leaf springs 166 yieldingly engage these notches so as to position the groove of the sleeve valve for exact registration with selected said wall ports.

Tracing the valve action, Fig. 7 shows the valve in neutral position, and which is to say that the groove 158 occupies the wide "neutral" space between the second and third ports in said several series of wall ports, hence isolates all of the top and bottom wall ports from the side wall ports. In this position the three pockets 145, 147 and 149 and the two manifolds 150 and 152 each are brought into communication with the hollow center of the sleeve valve and hence relieve pressure and hold all of the clutches inactive. Shifting the sleeve from this neutral position to the extreme left limit of travel brings the groove into registration with top wall port 133, bottom wall port 143, and side wall ports 123, wherefor pressure oil is delivered by pocket 145 above and manifold 150 below, through pipes 77 and 96, to the brake E and clutch D, respectively, giving "low reverse" ratio between the input shaft 33 and the output shaft 34. With the sleeve valve so positioned, connection by valve ports 161 and 163 to return pipes 164 is established from the other two pockets 147 and 149 and the remaining manifold 152. Shifting the rod 155 one notch toward the right brings the groove into registration with wall ports 124, 134 and 144, while at the same time positioning the left hand valve port 162 in registration with bottom wall port 143. In this position pressure oil continues to be supplied by pockets 145 to the brake E. Brake C is also now activated as pressure oil enters manifold 152, giving the "high reverse" ratio, and at the same time pressure is "dumped" by registering ports 143—162 from the previously activated clutch D.

Now as respects "forward" settings of the transmission, a positioning of the groove 158 so as to bring side wall ports 125 into communication with top and bottom wall ports 135 and 145 causes brake B and clutch D ("Low Forward") to be activated. The next notch to the right establishes communication from side wall ports 126 to top and bottom wall ports 136 and 146, which activates brake B and clutch C ("Intermediate Forward"). The third right-hand notch brings the groove into registration with wall ports 127, 137 and 147, whereupon clutches A and D are activated to obtain "Direct Drive Forward." The last right hand notch registers the groove 158 with wall ports 128, 138 and 148 to activate clutch A and brake C, giving the "Overdrive Forward." As each successive shift is made the valve ports are so positioned as to relieve pressure upon all clutches other than the two clutches being activated.

The invention and the manner of its operation should be clear from the foregoing description of my now preferred illustrated embodiment. Changes in the details of construction can self-evidently be resorted to without departing from the spirit of the invention and it is accordingly my intention that no limitations be implied and that the hereto annexed claims be given a scope fully commensurate with the broadest interpretation to which the employed language admits.

What I claim is:

1. In a transmission, the combination of coaxial input and output shafts, a first carrier associated with the input shaft and journaled for rotation about the center of the latter as an axis, a driven gear coaxial with the carrier and direct-driven thereby, a forward-drive planetary gear set and a reverse-drive planetary gear set each including a sun gear fast to the input shaft, each having a respective annular gear, and each having its planet gears carried by the carrier, a respective normally inactive means for each of said planetary gear sets operative when activated to arrest the rotation of the related annular gear, normally inactive means operative when activated to establish a direct driving couple from the input shaft to the carrier, a second carrier associated with the output shaft and journaled for rotation about an axis coinciding with the first carrier, a step-gear carried by said second carrier with the smaller gear thereof in mesh with said driven gear and having its larger gear in mesh with a drive gear fast to the output shaft, normally inactive means operative when activated to arrest the rotation of said second carrier, normally inactive means operative when activated to couple the second carrier directly to the output shaft, said normally inactive means including, in each instance, a respective annular piston activated by pressure fluid and working in a direction endwise to the axis of said shafts within a related cylinder which is in surrounding concentric relation to the axis of the shafts, and a selector valve operative by movement to each of six operating positions to establish communication from a source of pressure fluid simultaneously with a respective pair of said normally inactive means, each pair being different, one means of each pair being associated with the first carrier and the other means of each pair being associated with the second carrier.

2. In a transmission, the combination of co-axial input and output shafts, a first carrier associated with the input shaft and journaled for rotation about the center of the latter as an axis, a driven gear co-axial with the carrier and direct-driven thereby, a forward-drive planetary gear set and a reverse-drive planetary gear set each including a sun gear splined to the input shaft, each having a respective annular gear, and each having its planet gears carried by the carrier, a respective normally disengaged brake for each of said planetary gears sets acting when engaged to arrest the rotation of the related annular gear, a wheel splined to the input shaft, a normally disengaged clutch acting when engaged to couple the wheel directly to the carrier, a second carrier associated with the output shaft and journaled for rotation about an axis coinciding with the first carrier, a step-gear carried by said second carrier with the smaller gear thereof in mesh with said driven gear and having its larger gear meshing a drive gear fast to the output shaft, a normally disengaged brake acting when engaged to arrest the rotation of the second carrier, a wheel splined to the output shaft, and a normally disengaged clutch acting when engaged to couple the second carrier directly to the last named wheel, each of said brakes and clutches being a multiple-disc affair engaged by force of pressure fluid exerted upon a piston, the clutches which couple the wheels to the carriers each having its piston working in a cylinder formed in the related carrier, the pressure fluid for these carrier-carried pistons being fed to the concerned cylinders through passages one section of which is drilled in a hub portion of the related wheel.

References Cited in the file of this patent

UNITED STATES PATENTS

| | | |
|---|---|---|
| 760,160 | Smith et al. | May 17, 1904 |
| 802,175 | Seeley et al. | Oct. 17, 1905 |
| 2,151,714 | Pavesi | Mar. 28, 1939 |
| 2,589,118 | O'Leary | Mar. 11, 1952 |
| 2,663,199 | Harrison | Dec. 22, 1953 |